United States Patent
Takada et al.

(10) Patent No.: US 8,962,727 B2
(45) Date of Patent: Feb. 24, 2015

(54) INORGANIC FINE PARTICLE DISPERSANT AND INORGANIC FINE PARTICLE DISPERSION USING THE SAME

(75) Inventors: Yasuhiro Takada, Sakura (JP); Tomoko Shishikura, Sakura (JP); Ryo Minakuchi, Sakura (JP); Shinichi Kudo, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/810,152

(22) PCT Filed: Jul. 11, 2011

(86) PCT No.: PCT/JP2011/065803
§ 371 (c)(1),
(2), (4) Date: Mar. 19, 2013

(87) PCT Pub. No.: WO2012/008415
PCT Pub. Date: Jan. 19, 2012

(65) Prior Publication Data
US 2013/0172463 A1    Jul. 4, 2013

(30) Foreign Application Priority Data
Jul. 12, 2010    (JP) .................................. 2010-157752

(51) Int. Cl.
*C08K 5/24* (2006.01)
*C08K 3/10* (2006.01)
*C08L 83/00* (2006.01)
*C04B 14/04* (2006.01)
(Continued)

(52) U.S. Cl.
CPC . *C08K 3/36* (2013.01); *C08G 77/16* (2013.01); *C08G 77/18* (2013.01); *C08G 77/20* (2013.01); *C09D 7/02* (2013.01); *C09D 183/06* (2013.01); *B01F 17/0071* (2013.01); *C08K 3/22* (2013.01); *C08K 5/10* (2013.01); *B01F 17/0007* (2013.01)
USPC ........... 524/264; 524/413; 524/588; 106/481; 106/499

(58) Field of Classification Search
USPC ................... 106/481, 499; 524/264, 413, 588
See application file for complete search history.

(56) References Cited

U.S. PATENT DOCUMENTS 5,840,806 A * 11/1998 Komazaki et al. ............ 525/101

FOREIGN PATENT DOCUMENTS

JP    06-228457    *    8/1994    ................ C09C 3/12
JP    06-228457 A        8/1994
(Continued)

OTHER PUBLICATIONS

International Search Report of PCT/JP2011/061841, mailing date of Sep. 6, 2011.

*Primary Examiner* — Shuangyi Abu Ali
(74) *Attorney, Agent, or Firm* — Westerman, Hattori, Daniels & Adrian, LLP

(57) ABSTRACT

Provided is a inorganic fine particle dispersant comprising, as an essential component, a compound resin (A) in which a polysiloxane segment (a1) having a structural unit represented by general formula (1) and/or general formula (2) and a silanol group and/or a hydrolyzable silyl group is bonded to a vinyl-based polymer segment (a2) through a bond represented by general formula (3). An inorganic fine particle dispersion liquid that contains the inorganic fine particle dispersant and inorganic fine particles, an inorganic fine particle dispersion containing the inorganic fine particle dispersion liquid, a paint, and a cured product are also provided.

3 Claims, No Drawings

(51) Int. Cl.
  *C08K 5/00* (2006.01)
  *C08K 3/36* (2006.01)
  *C08G 77/16* (2006.01)
  *C08G 77/18* (2006.01)
  *C08G 77/20* (2006.01)
  *C09D 7/02* (2006.01)
  *C09D 183/06* (2006.01)
  *B01F 17/54* (2006.01)
  *C08K 3/22* (2006.01)
  *C08K 5/10* (2006.01)
  *B01F 17/00* (2006.01)

(56) References Cited

FOREIGN PATENT DOCUMENTS

| | | |
|---|---|---|
| JP | 07-098657 B2 | 10/1995 |
| JP | 08-013938 B2 | 2/1996 |
| JP | 2000-281934 A | 10/2000 |
| JP | 2001-329175 A | 11/2001 |
| JP | 2003-026927 A | 1/2003 |
| JP | 2006-328354 A | 12/2006 |
| WO | 96/35755 A1 | 11/1996 |

* cited by examiner

INORGANIC FINE PARTICLE DISPERSANT AND INORGANIC FINE PARTICLE DISPERSION USING THE SAME

TECHNICAL FIELD

The present invention relates to an inorganic fine particle dispersant that can be used to disperse inorganic fine particles such as silica fine particles in a dispersion medium and a reactive compound and to an inorganic fine particle dispersion liquid and an inorganic fine particle dispersion using the dispersant.

BACKGROUND ART

In order to achieve properties of organic polymers such as formability and flexibility and properties of inorganic materials such as heat resistance, wear resistance, and surface hardness, studies on blending inorganic fine particles to organic polymers have been widely conducted.

For example, according to a design that utilizes the properties inherent to inorganic materials, a higher compounding effect can be expected from blending inorganic fine particles having smallest possible particle size at a high concentration. This is because the smaller the particle size, the larger the surface area of the inorganic fine particles per unit weight and the wider the interface regions between organic polymers and inorganic materials. When the concentration of the inorganic fine particles is high, the properties of the inorganic materials can be more strongly exhibited.

Most of such blend systems of organic polymers and inorganic fine particles use liquid organic polymers, monomers which are starting materials for organic polymers, organic solvents, and the like, and are available as liquid products such as paints and inks from the viewpoint of coating and handling ease. Meanwhile, it is also known that when such inorganic fine particles are blended into dispersion media at high concentrations, it is difficult to obtain stable dispersion liquids and various problems arise during manufacturing processes and adversely affect the value of products obtained by the processes. In other words, inorganic fine particles of extremely small particle size have high surface activity and thus undergo secondary aggregation, resulting in problems such as low dispersion stability due to the secondary aggregates and lack of uniformity of properties such as coating film properties differing among parts of coating films.

Examples of known techniques of dispersing inorganic fine particles such as silica in organic polymers include a method with which inorganic fine particles surface-treated with a coupling agent are dispersed in a resin (refer to PTL 1), a method with which inorganic fine particles are dispersed by using a surfactant (refer to PTL 2), and a method with which inorganic fine particles are dispersed by using a mixture of a lactone-modified carboxyl-group-containing (meth)acrylate and caprolactone of (meth)acrylic acid (refer to PTL 3).

PTL 1: Japanese Examined Patent Application Publication No. 7-98657

PTL 2: Japanese Examined Patent Application Publication No. 8-13938

PTL 3: Japanese Unexamined Patent Application Publication No. 2000-281934

PTL 4: International publication No. 96/035755 pamphlet

PTL 5: Japanese Unexamined Patent Application Publication No. 2006-328354

DISCLOSURE OF INVENTION

Problems to be Solved by the Invention

An object of the present invention is to provide an inorganic fine particle dispersant capable of stably dispersing inorganic fine particles such as silica fine particles in a dispersion medium or a reactive compound at a high concentration, an inorganic fine particle dispersion liquid having excellent storage stability and fluidity, an inorganic fine particle dispersion containing the inorganic fine particle dispersion liquid, a paint that uses the dispersion, and a cured product obtained by curing the paint.

Means for Solving Problems

The inventors of the present invention have found that a compound resin that has a polysiloxane segment having a silanol group and/or a hydrolyzable silyl group and a polymer segment other than the polysiloxane can be used as an inorganic fine particle dispersant capable of easily dispersing inorganic fine particles such as silica fine particles and that an inorganic fine particle dispersion liquid and an inorganic fine particle dispersion each in which inorganic fine particles are dispersed by using the dispersant have excellent storage stability and fluidity. It has also been found that when the compound resin has a polymerizable double bond, the inorganic fine particle dispersion becomes curable by an active energy ray such as UV rays and the obtained coating films have particularly excellent surface properties such as weatherability and resistance to wear testing. In particular, it has been found that when an acrylic monomer, a polyisocyanate, or the like is used as the reactive compound, physical properties of a coating film obtained by three-dimensional crosslinking between the compound resin serving as a dispersant and the reactive compound are particularly excellent.

A compound resin that has a polysiloxane segment having a silanol group and/or a hydrolyzable silyl group and a polymer segment other than the polysiloxane is the invention made by the inventors (e.g., refer to PTL 4 and PTL 5). The compound resin is developed as a curable paint. PTL 4 and PTL 5 describe that a curable paint that uses the compound resin is particularly suitable for use as paints for building exteriors and the like. However, that this compound resin is useful as a dispersant for inorganic fine particles has been completely unknown.

The present invention provides an inorganic fine particle dispersant including, as an essential component, a compound resin (A) in which a polysiloxane segment (a1) having a structural unit represented by general formula (1) and/or general formula (2) and a silanol group and/or a hydrolyzable silyl group is bonded to a vinyl-based polymer segment (a2) through a bond represented by general formula (3):

[Chem. 1]

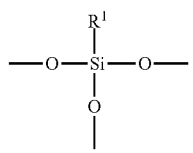

(1)

-continued

[Chem. 2]

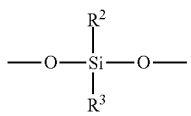
(2)

(In general formulae (1) and (2), $R^1$, $R^2$, and $R^3$ each independently represent a group having one polymerizable double bond selected from the group consisting of —$R^4$—CH=$CH_2$, —$R^4$—C($CH_3$)=$CH_2$, —$R^4$—O—CO—C($CH_3$)=$CH_2$, and —$R^4$—O—CO—CH=$CH_2$ (where $R^4$ represents a single bond or an alkylene group having 1 to 6 carbon atoms), an alkyl group having 1 to 6 carbon atoms, a cycloalkyl group having 3 to 8 carbon atoms, an aryl group, or an aralkyl group having 7 to 12 carbon atoms.)

[Chem. 3]

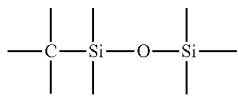
(3)

(In general formula (3), the carbon atom is part of the vinyl-based polymer segment (a2) and the silicon atom bonded only to the oxygen atom is part of the polysiloxane segment (a1).).

The present invention also provides an inorganic fine particle dispersion liquid that contains the inorganic fine particle dispersant and inorganic fine particles.

The present invention also provides an inorganic fine particle dispersion in which inorganic fine particles and the inorganic fine particle dispersant described above are dispersed in a reactive compound.

Advantageous Effects of Invention

An inorganic fine particle dispersant according to the present invention is capable of stably dispersing inorganic fine particles such as silica fine particles and titanium oxide in a reactive compound at a high concentration. The inorganic fine particle dispersion obtained therefrom exhibits excellent storage stability and fluidity. A paint that uses the dispersion is particularly useful as building exterior paints required to have long-term weatherability and paints for readily thermally deformable substrates such as plastic when cured by heat or an active energy ray, and has long-term outdoor weatherability (in particular, crack resistance) and excellent wear resistance. In particular, when the compound resin (A) has a polymerizable double bond or an alcoholic hydroxyl group and an acrylic monomer, polyisocyanate, or the like is used as the reactive compound, three-dimensional crosslinking occurs between the compound resin (A) serving as a dispersant and a reactive diluent and thus coating films that have particularly high weatherability can be obtained. Moreover, when the polysiloxane segment content in the compound resin (A) serving as a dispersant is within a particular range and a coating film is obtained by curing the resin with an active energy ray such as a UV ray without conducting heating at high temperature, the coating film can exhibit excellent wear resistance and high adhesion to plastic substrates.

DESCRIPTION OF EMBODIMENTS (Inorganic Fine Particle Dispersant—Compound Resin (A))

A compound resin (A) used in the present invention is a compound resin in which a structural unit represented by general formula (1) and/or (2) described above and a polysiloxane segment (a1) having a silanol group and/or a hydrolyzable silyl group (hereinafter simply referred to as polysiloxane segment (a1)) is bonded to a vinyl-based polymer segment (a2) having an alcoholic hydroxyl group (hereinafter simply referred to as vinyl-based polymer segment (a2)) through a bond represented by general formula (3) above.

A dehydration condensation reaction occurs between the silanol group and/or hydrolyzable silyl group of the polysiloxane segment (a1) described below and the silanol group and/or hydrolyzable silyl group of the vinyl-based polymer segment (a2) described below and a bond represented by general formula (3) above is formed as a result. Accordingly, in general formula (3), the carbon atom is part of the vinyl-based polymer segment (a2) and the silicon atom bonded only to the oxygen atom is part of the polysiloxane segment (a1).

Examples of the form of the compound resin (A) include a compound resin having a graft structure in which the polysiloxane segment (a1) is chemically bonded to the vinyl-based polymer segment (a2) by forming a side chain and a compound resin having a block structure in which the polymer segment (a2) and the polysiloxane segment (a1) are chemically bonded.

(Compound Resin (A)—Polysiloxane Segment (a1))

The polysiloxane segment (a1) in the present invention is a segment that has a structural unit represented by general formula (1) and/or (2) and a silanol group and/or a hydrolyzable silyl group.

(Structural Unit Represented by General Formula (1) and/or (2))

In particular, in general formulae (1) and (2), $R^1$, $R^2$, and $R^3$ each independently represent a group having one polymerizable double bond selected from the group consisting of —$R^4$—CH=$CH_2$, —$R^4$—C($CH_3$)=$CH_2$, —$R^4$—O—CO—C($CH_3$)=$CH_2$, and —$R^4$—O—CO—CH=$CH_2$ (where $R^4$ represents a single bond or an alkylene group having 1 to 6 carbon atoms), an alkyl group having 1 to 6 carbon atoms, a cycloalkyl group having 3 to 8 carbon atoms, an aryl group, or an aralkyl group having 7 to 12 carbon atoms.

Examples of the alkylene group having 1 to 6 carbon atoms for by $R^4$ include a methylene group, an ethylene group, a propylene group, an isopropylene group, a butylene group, an isobutylene group, a sec-butylene group, a tert-butylene group, a pentylene group, an isopentylene group, a neopentylene group, a tert-pentylene group, a 1-methylbutylene group, a 2-methylbutylene group, a 1,2-dimethylpropylene group, a 1-ethylpropylene group, a hexylene group, an isohexylene group, a 1-methylpentylene group, a 2-methylpentylene group, a 3-methylpentylene group, a 1,1-dimethylbutylene group, a 1,2-dimethylbutylene group, a 2,2-dimethylbutylene group, a 1-ethylbutylene group, a 1,1,2-trimethylpropylene group, a 1,2,2-trimethylpropylene group, a 1-ethyl-2-methylpropylene group, and a 1-ethyl-1-methylpropylene group. In particular, $R^4$ is preferably a single bond or an alkylene group having 2 to 4 carbon atoms due to high availability of the raw material.

Examples of the alkyl group having 1 to 6 carbon atoms include a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, and a 1-ethyl-1-methylpropyl group.

Examples of the cycloalkyl group having 3 to 8 carbon atoms include a cyclopropyl group, a cyclobutyl group, a cyclopentyl group, and a cyclohexyl group.

Examples of the aryl group include a phenyl group, a naphthyl group, a 2-methylphenyl group, a 3-methylphenyl group, a 4-methylphenyl group, a 4-vinylphenyl group, and a 3-isopropylphenyl group.

Examples of the aralkyl group having 7 to 12 carbon atoms include a benzyl group, a diphenylmethyl group, and a naphthylmethyl group.

When at least one of $R^1$, $R^2$, and $R^3$ is a group having a polymerizable double bond as described above, curing can be conducted by an active energy ray or the like. Due to two curing mechanisms, namely, an active energy ray and an improved crosslinking density of a coating film caused by a condensation reaction of a silanol group and/or a hydrolyzable silyl group, a cured product having higher wear resistance, acid resistance, alkali resistance, and solvent resistance can be formed and thus the dispersant is suitable for use in paints for building exteriors and for use with readily thermally deformable substrates, such as plastic substrates, to which thermosetting resin compositions are not suitable.

Two or more groups having a polymerizable double bond are preferably present in a polysiloxane segment (a1) and more preferably 3 to 200 and most preferably 3 to 50 such groups are present since a coating film having a higher wear resistance can be obtained. In particular, as long as the polymerizable double bond content in the polysiloxane segment (a1) is 3 to 35 wt %, desired wear resistance can be obtained. Note that a polymerizable double bond referred here is a general name for groups that can undergo free-radical propagation reaction selected from among a vinyl group, a vinylidene group, and a vinylene group. The polymerizable double bond content is in terms of percent by weight of the vinyl, vinylene, or vinylene group in the polysiloxane segment.

All known functional groups each containing a vinyl group, a vinylidene group, or a vinylene group can be used as the group having a polymerizable double bond. Among these, a (meth)acryloyl group represented by —$R^4$—C($CH_3$)=$CH_2$ or —$R^4$—O—CO—C($CH_3$)=$CH_2$ exhibits high reactivity during UV curing and good compatibility with the vinyl-based polymer segment (a2) described below.

The structural unit represented by general formula (1) and/or general formula (2) described above are three-dimensional network polysiloxane structural unit in which two or three of dangling bonds of the silicon atom are involved in crosslinking. Although a three-dimensional network structure is formed, the network structure is not dense and thus gelation or the like does not occur and the storage stability is improved.

(Compound Resin (A)—Silanol Group and/or Hydrolyzable Silyl Group)

In the present invention, a silanol group refers to a silicon-containing group that has a hydroxyl group directly bonded to a silicon atom. The silanol group is preferably a silanol group generated when a hydrogen atom is bonded to the oxygen atom having a dangling bond in the structural units represented by general formula (1) and/or general formula (2) above.

In the present invention, a hydrolyzable silyl group refers to a silicon-containing group having a hydrolyzable group directly bonded to a silicon atom. Examples thereof include groups represented by general formula (4):

[Chem. 4]

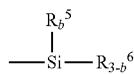

(4)

(In general formula (4), $R^5$ represents a monovalent organic group such as an alkyl group, an aryl group, or an aralkyl group and $R^6$ represents a hydrolyzable group selected from the group consisting of a halogen atom, an alkoxy group, an acyloxy group, a phenoxy group, an aryloxy group, a mercapto group, an amino group, an amide group, an aminoxy group, an iminoxy group, and an alkenyloxy group. Moreover, b represents an integer of 0 to 2.)

Examples of the alkyl group for $R^5$ include a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, and a 1-ethyl-1-methylpropyl group.

Examples of the aryl group include a phenyl group, a naphthyl group, a 2-methylphenyl group, a 3-methylphenyl group, a 4-methylphenyl group, a 4-vinylphenyl group, and a 3-isopropylphenyl group.

Examples of the aralkyl group include a benzyl group, a diphenylmethyl group, and a naphthylmethyl group.

Examples of the halogen atom for $R^6$ include a fluorine atom, a chlorine atom, a bromine atom, and an iodine atom.

Examples of the alkoxy group include a methoxy group, an ethoxy group, a propoxy group, an isopropoxy group, a butoxy group, a sec-butoxy group, and a tert-butoxy group.

Examples of the acyloxy group include formyloxy, acetoxy, propanoyloxy, butanoyloxy, pivaloyloxy, pentanoyloxy, phenylacetoxy, acetoacetoxy, benzoyloxy, and naphthoyloxy.

Examples of the aryloxy group include phenyloxy and naphthyloxy.

Examples of the alkenyloxy group include a vinyloxy group, an allyloxy group, a 1-propenyloxy group, an isopropenyloxy group, a 2-butenyloxy group, a 3-butenyloxy group, a 2-pentenyloxy group, a 3-methyl-3-butenyloxy group, and a 2-hexenyloxy group.

When the hydrolyzable group represented by $R^6$ is hydrolyzed, the hydrolyzable silyl group represented by general formula (4) forms a silanol group. Among these, a methoxy group and an ethoxy group are preferred since they have high hydrolyzability.

In particular, the hydrolyzable silyl group is preferably a hydrolyzable silyl group in which the oxygen atom having a dangling bond in the structural unit represented by general formula (1) and/or general formula (2) is bonded to or substituted with the hydrolyzable group described above.

Regarding the silanol group and the hydrolyzable silyl group described above, a hydrolytic condensation reaction proceeds among the hydroxyl group in the silanol group and the hydrolyzable group in the hydrolyzable silyl group; thus, the crosslinking density of the polysiloxane structure of a cured product obtained is increased and a cured product having excellent solvent resistance or the like can be formed.

They are also used in bonding the polysiloxane segment (a1) that contains a silanol group and/or a hydrolyzable silyl group and the vinyl-based polymer segment (a2) described below through a bond represented by general formula (3).

Examples of the polysiloxane segment (a1) having a structure in which at least one of $R^1$, $R^2$, and $R^3$ is a group having a polymerizable double bond include the following structures:

[Chem. 5]
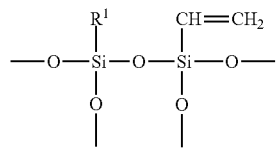

[Chem. 6]
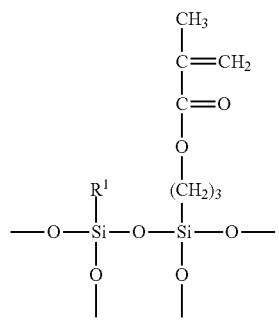

[Chem. 7]
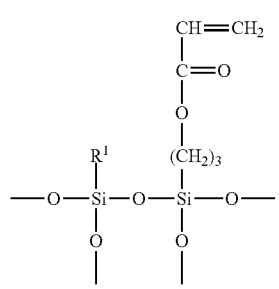

[Chem. 8]
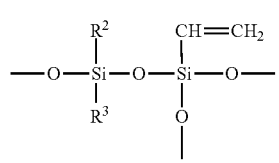

[Chem. 9]
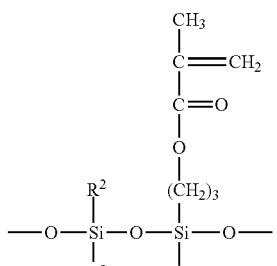

[Chem. 10]
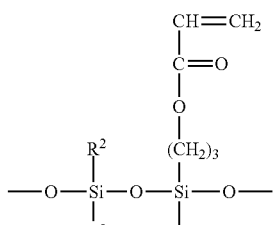

[Chem. 11]
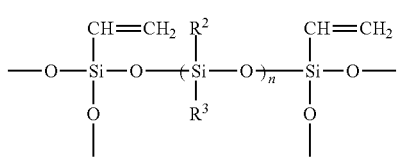

[Chem. 12]
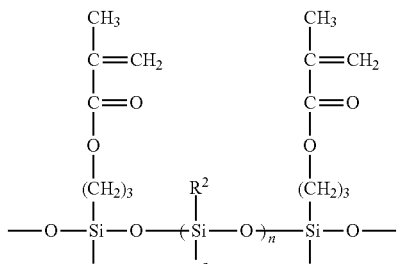

[Chem. 13]
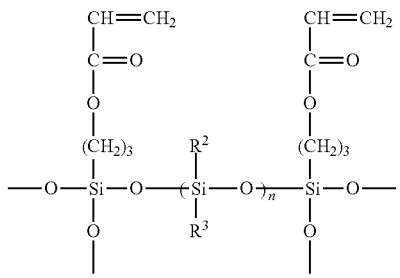

In the present invention, the polysiloxane segment (a1) is preferably contained in an amount of 10 to 90 wt % relative to the compound resin (A) which is the main component of the inorganic fine particle dispersant. As a result, an antifouling property, wear resistance, and weatherability can be achieved.

(Compound Resin (A)—Vinyl-Based Polymer Segment (a2))

A vinyl-based polymer segment (a2) in the present invention is a vinyl polymer segment such as an acryl-based polymer, a fluoroolefin-based polymer, a vinyl ester-based polymer, an aromatic vinyl-based polymer, or a polyolefin-based polymer. These may be appropriately selected according to the usage.

The acryl-based polymer segment is obtained by polymerization or copolymerization of common (meth)acrylic monomers. The (meth)acrylic monomers are not particularly limited and vinyl monomers can also be copolymerized. Examples of the monomers include alkyl(meth)acrylates each having an alkyl group with 1 to 22 carbon atoms such as methyl(meth)acrylate, ethyl(meth)acrylate, n-propyl(meth)acrylate, n-butyl(meth)acrylate, isobutyl(meth)acrylate, tert-butyl(meth)acrylate, 2-ethylhexyl(meth)acrylate, and lauryl(meth)acrylate; aralkyl(meth)acrylates such as benzyl(meth)acrylate and 2-phenylethyl(meth)acrylate; cycloalkyl(meth)acrylates such as cyclohexyl(meth)acrylate and isobornyl(meth)acrylate; ω-alkoxyalkyl(meth)acrylates such as 2-methoxyethyl(meth)acrylate and 4-methoxybutyl(meth)acrylate; carboxylic acid vinyl esters such as vinyl acetates, vinyl propionate, vinyl pivalate, and vinyl benzoate; alkyl esters of crotonic acid such as methyl crotonate and ethyl crotonate; dialkyl esters of unsaturated dibasic acids such as dimethyl maleate, di-n-butyl maleate, dimethyl fumarate, and dimethyl itaconate; α-olefins such as ethylene and propylene; fluoroolefins such as vinylidene fluoride, tetrafluoroethylene, hexafluoropropylene, and chlorotrifluoroethylene; alkyl vinyl ethers such as ethyl vinyl ether and n-butylvinyl ether; cycloalkyl vinyl ethers such as cyclopentyl vinyl ether and cyclohexyl vinyl ether; and tertiary amide-containing monomers such as N,N-dimethyl(meth)acrylamide, N-(meth)acryloylmorpholine, N-(meth)acryloylpyrrolidine, and N-vinylpyrrolidone.

There is no limit on the polymerization method, the solvent, and the polymerization initiator used in copolymerizing the monomers described above and the vinyl-based polymer segment (a2) can be obtained by a known method. For example, a vinyl-based polymer segment (a2) can be obtained by any of various polymerization processes such as bulk radical polymerization, solution radical polymerization, and non-aqueous dispersion radical polymerization by using a polymerization initiator such as 2,2'-azobis(isobutyronitrile), 2,2'-azobis(2,4-dimethylvaleronitrile), 2,2'-azobis(2-methylbutyronitrile), tert-butylperoxy pivalate, tert-butylperoxy benzoate, tert-butylperoxy-2-ethyl hexanoate, di-tert-butyl peroxide, cumene hydroperoxide, or diisopropyl peroxy carbonate.

The number-average molecular weight (hereinafter referred to as Mn) of the vinyl-based polymer segment (a2) is preferably in the range of 500 to 200,000 since thickening and gelation can be prevented during production of the compound resin (A) and durability can be improved. Mn is more preferably in the range of 700 to 100,000 and yet more preferably in the range of 1,000 to 50,000 since a satisfactory cured film can be formed on a substrate.

The vinyl-based polymer segment (a2) has a silanol group and/or a hydrolyzable silyl group directly bonded to the carbon atom in the vinyl-based polymer segment (a2) in order to form the compound resin (A) in which the vinyl-based polymer segment (a2) is bonded to the polysiloxane segment (a1) through a bond represented by general formula (3). The silanol group and/or hydrolyzable silyl group is rarely present in the vinyl-based polymer segment (a2) of the resulting final product, i.e., the compound resin (A), since these groups form the bond represented by general formula (3) during production of the compound resin (A) described below. However, the silanol group and/or the hydrolyzable silyl group may remain in the vinyl-based polymer segment (a2). During the formation of a coating film by a curing reaction of the group having a polymerizable double bond described above, the hydrolytic condensation reaction proceeds between the hydroxyl groups in the silanol group or the hydrolyzable groups in the hydrolyzable silyl group simultaneously with the curing reaction. Thus, the crosslinking density of the resulting cured product, i.e., the polysiloxane structure, is increased and a cured product having high solvent resistance and the like can be formed.

Specifically, a vinyl-based polymer segment (a2) having a silanol group and/or a hydrolyzable silyl group directly bonded to a carbon atom is obtained by copolymerizing the common monomer described above and a vinyl-based monomer containing a silanol group and/or a hydrolyzable silyl group directly bonded to a carbon bond.

Examples of the silanol group and/or the hydrolyzable silyl group directly bonded to a carbon atom include vinyltrimethoxysilane, vinyltriethoxysilane, vinylmethyldimethoxysilane, vinyltri(2-methoxyethoxy)silane, vinyltriacetoxysilane, vinyltrichlorosilane, 2-trimethoxysilylethylvinyl ether, 3-(meth)acryloyloxypropyltrimethoxysilane, 3-(meth)acryloyloxypropyltriethoxysilane, 3-(meth)acryloyloxypropylmethyldimethoxysilane, and 3-(meth)acryloyloxypropyltrichlorosilane. Among these, vinyltrimethoxysilane and 3-(meth)acryloyloxypropyltrimethoxysilane are preferred since they allow smooth hydrolysis and by-products after the reaction can be easily removed.

When a reactive compound such as a polyisocyanate described below is to be contained, the vinyl-based polymer segment (a2) preferably has a reactive functional group such as an alcoholic hydroxyl group. For example, the vinyl-based polymer segment (a2) having an alcoholic hydroxyl group can be obtained by copolymerization with a (meth)acrylic monomer having an alcoholic hydroxyl group. Specific examples of the (meth)acrylic monomer having an alcoholic hydroxyl group include various hydroxyl alkyl esters of α- and β-ethylenically unsaturated carboxylic acids and their adducts with ε-caprolactone, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethyl monobutyl fumarate, polyethylene glycol mono(meth)acrylate, polypropylene glycol mono(meth)acrylate, and "PLACCEL FM or PLACCEL FA" [caprolactone-added monomer produced by Daicel Corporation].

Among these, 2-hydroxyethyl(meth)acrylate is preferred for its ease of reaction.

The amount of the alcoholic hydroxyl groups is preferably appropriately determined by calculation based on the amount of the polyisocyanate added described below.

(Method for Producing Compound Resin (A))

In particular, the compound resin (A) used in the present invention is produced by any of (Method 1) to (Method 3) described below.

(Method 1) The common (meth)acrylic monomer and the like and a vinyl-based monomer containing a silanol group and/or a hydrolyzable silyl group directly bonded to the carbon bond are copolymerized so as to obtain a vinyl-based polymer segment (a2) having a silanol group and/or a hydrolyzable silyl group directly bonded to the carbon bond. The vinyl-based polymer segment (a2) is mixed with a silane compound to conduct a hydrolytic condensation reaction. If there is a group to be introduced, a silane compound having a group to be introduced is used. For example, when an aryl group is to be introduced, an appropriate silane compound having an aryl group and a silanol group and/or a hydrolyzable silyl group may be used. In order to introduce a group having a polymerizable double bond, a silane compound having a group having a polymerizable double bond and a silanol group and/or hydrolyzable silyl group may be used.

According to this method, a hydrolytic condensation reaction occurs between the silanol group or hydrolyzable silyl group of the silane compound and the silanol group and/or the hydrolyzable silyl group of the vinyl-based polymer segment (a2) having the silanol group and/or the hydrolyzable silyl group directly bonded to the carbon bond so as to form a polysiloxane segment (a1) and to obtain a compound resin (A) in which the polysiloxane segment (a1) is compounded with the vinyl-based polymer segment (a2) through the bond represented by general formula (3) above.

(Method 2) A vinyl-based polymer segment (a2) having a silanol group and/or a hydrolyzable silyl group directly bonded to a carbon bond is obtained as in Method 1.

A silane compound (when there is a group to be introduced, a silane compound having the group to be introduced is used) is subjected to a hydrolytic condensation reaction to obtain a polysiloxane segment (a1). Then a hydrolytic condensation reaction is induced between the silanol group and/or the hydrolyzable silyl group of the vinyl-based polymer segment (a2) and the silanol group and/or the hydrolyzable silyl group of the polysiloxane segment (a1).

(Method 3) A vinyl-based polymer segment (a2) having a silanol group and/or a hydrolyzable silyl group directly bonded to a carbon bond is obtained as in Method 1. A polysiloxane segment (a1) is obtained as in Method 2. Then a hydrolytic condensation reaction is induced by mixing a silane compound or the like that has a group to be introduced as needed.

Examples of the silane compound that has both a group having a polymerizable double bond and a silanol group and/or a hydrolyzable silyl group used in introducing the group having a polymerizable double bond include vinyltrimethoxysilane, vinyltriethoxysilane, vinylmethyldimethoxysilane, vinyltri(2-methoxyethoxy)silane, vinyltriacetoxysilane, vinyltrichlorosilane, 2-trimethoxysilylethylvinyl ether, 3-(meth)acryloyloxypropyltrimethoxysilane, 3-(meth)acryloyloxypropyltriethoxysilane, 3-(meth)acryloyloxypropylmethyldimethoxysilane, and 3-(meth)acryloyloxypropyltrichlorosilane. Among these, vinyltrimethoxysilane and 3-(meth)acryloyloxypropyltrimethoxysilane are preferred since the hydrolytic reaction can be smoothly carried out and the by-products after the reaction can be easily removed.

Examples of the common silane compound used in (Method 1) to (Method 3) above include various organotrialkoxysilanes such as methyltrimethoxysilane, methyltriethoxysilane, methyltri-n-butoxysilane, ethyltrimethoxysilane, n-propyltrimethoxysilane, iso-butyltrimethoxysilane, and cyclohexyltrimethoxysilane; various diorganodialkoxysilanes such as dimethyldimethoxysilane, dimethyldiethoxysilane, dimethyldi-n-butoxysilane, dimethyldimethoxysilane, and methylcyclohexyldimethoxysilane; and chlorosilanes such as methyltrichlorosilane, ethyltrichlorosilane, vinyltrichlorosilane, dimethyldichlorosilane, and dimethyldichlorosilane. Among these, organotrialkoxysilanes and diorganodialkoxysilanes are preferred since the hydrolytic reaction can be smoothly carried out and the by-products after the reaction can be easily removed.

Tetrafunctional alkoxysilane compounds and partially hydrolyzed condensates of the tetrafunctional alkoxysilane compounds, such as tetramethoxysilane, tetraethoxysilane, and tetra-n-propoxysilane, can be used in addition as long as the effects of the present invention are not impaired. When a tetrafunctional alkoxysilane compound or a partially hydrolyzed condensate thereof is used in addition, the number of the silicon atoms of the tetrafunctional alkoxysilane compound is preferably not over 20 mol % relative to all silicon atoms in the polysiloxane segment (a1).

A metal alkoxide compound of boron, titanium, zirconium, aluminum, or the like, other than the silicon atom may be used in combination with the silane compound as long as the effects of the present invention are not impaired. For example, the number of the metal atoms of the metal alkoxide compound relative to the number of all silicon atoms in the polysiloxane segment (a1) is preferably not over 25 mol %.

The hydrolytic condensation reaction in the (Method 1) to (Method 3) described above refers to a condensation reaction that occurs between hydroxyl groups formed by hydrolysis of some of the hydrolyzable groups due to influence of water and the like or between the hydroxyl groups and hydrolyzable groups. The hydrolytic condensation reaction can be carried out by a known method but a method with which the reaction is proceeded by supplying water and a catalyst in the production process described above is convenient and is thus preferred.

Examples of the catalyst used include inorganic acids such as hydrochloric acid, sulfuric acid, and phosphoric acid; organic acids such as p-toluene sulfonic acid, monoisopropyl phosphonate, and acetic acid; inorganic bases such as sodium hydroxide and potassium hydroxide; titanates such as tetraisopropyl titanate and tetrabutyl titanate; compounds containing various basic nitrogen atoms such as 1,8-diazabicyclo[5.4.0]undecene-7 (DBU), 1,5-diazabicyclo[4.3.0]nonene-5 (DBN), 1,4-diazabicyclo[2.2.2]octane (DABCO), tri-n-butylamine, dimethylbenzylamine, monoethanolamine, imidazole, and 1-methylimidazole; quaternary ammonium salts having a chloride, a bromide, a carboxylate, or a hydroxide as the counterion, such as tetramethyl ammonium salts, tetrabutyl ammonium salts, and dilauryldimethyl ammonium salts; and tin carboxylic acid salts such as dibutyltin diacetate, dibutyltin dioctate, dibutyltin dilaurate, dibutyltin diacetylacetonate, tin octylate, and tin stearate. These catalysts may be used alone or in combination.

The amount of the catalyst added is not limited. In general, the catalyst is preferably used in an amount in the range of 0.0001 to 10 wt %, more preferably 0.0005 to 3 wt %, and most preferably 0.001 to 1 wt % relative to the total amount of the compounds having a silanol group or a hydrolyzable silyl group.

The amount of water supplied is preferably 0.05 mol or more, more preferably 0.1 mol or more and particularly preferably 0.5 mol or more per mole of silanol groups or hydrolyzable silyl groups of the compounds having silanol groups or hydrolyzable silyl groups.

These catalysts and water may be added in batch or sequentially. A mixture of a catalyst and water prepared in advance may also be supplied.

The reaction temperature during the hydrolytic condensation reaction in (Method 1) to (Method 3) above is within the range of 0° C. to 150° C. and preferably 20° C. to 100° C. The condition of the reaction pressure may be any, e.g., the pressure may be normal, high, or low. Alcohols and water which are by-products of the hydrolytic condensation reaction may be removed by distillation or the like as needed.

The feed ratios of the compounds used in (Method 1) to (Method 3) described above are appropriately selected according to the structure of the compound resin (A) desirably used in the present invention. In particular, the compound resin (A) is preferably obtained so that the polysiloxane segment (a1) content is 10 to 90 wt % and more preferably 30 to 75 wt % since the durability of the coating film obtained therefrom is high.

An example of a specific method for compounding a polysiloxane segment and a vinyl-based polymer into a block structure in the (Method 1) to (Method 3) above is a method with which a vinyl-based polymer segment having a silanol group and/or a hydrolyzable silyl group only at one or both termini of a polymer chain is used as an intermediate and, in (Method 1) for example, a silane compound is mixed with the vinyl-based polymer segment to conduct a hydrolytic condensation reaction.

An example of a specific method for grafting a polysiloxane segment to a vinyl-based polymer segment in (Method 1) to (Method 3) above is a method with which a vinyl-based polymer segment having a silanol group and/or a hydrolyzable silyl group randomly distributed in the main chain of the vinyl-based polymer segment is used as an intermediate and, in (Method 2) for example, a hydrolytic condensation reaction is carried out between the silane compound and the silanol group and/or the hydrolyzable silyl group of the vinyl-based polymer segment.

(Inorganic Fine Particles)

Inorganic fine particles used in the present invention are preferably silica fine particles or titanium oxide fine particles since the effects of the present invention can be maximized. Since the compound resin (A) used in the present invention has a polysiloxane segment, the compound resin (A) is highly compatible with the inorganic components and inorganic fine particles can be smoothly dispersed even when the amount added exceeds 50 wt %. After dispersing, the inorganic fine particles do not precipitate or harden but exhibit long-term storage stability. The vinyl-based polymer segment is highly compatible with reactive compounds and thus an inorganic fine particle dispersion liquid prepared by using an inorganic fine particle dispersant containing the compound resin (A) as an essential component satisfactorily disperses in a reactive compound and gives a highly stable dispersion.

Silica fine particles are not particularly limited and known silica fine particles such as powder silica and colloidal silica can be used. Examples of commercially available powder silica fine particles include AEROSIL 50 and 200 produced by Aerosil Japan, SILDEX H31, H32, H51, H52, H121, and H122 produced by Asahi Glass Co., Ltd., E220A and E220 produced by Nippon Silica Kogyo K.K., SYLYSIA 470 produced by Fuji Silysia Chemical Ltd., and SG flake produced by Nippon Sheet Glass Co. Ltd.

Examples of commercially available colloidal silica include methanol silica sol, IPA-ST, MEK-ST, NBA-ST, XBA-ST, DMAC-ST, ST-UP, ST-OUP, ST-20, ST-40, ST-C, ST-N, ST-O, ST-50, and ST-OL produced by Nissan Chemical Industries, Ltd.

Silica fine particles having dispersibility improved by a known method may also be used. Examples of the silica fine particles having improved dispersibility include those obtained by surface-treating silica fine particles with a reactive silane coupling agent having a hydrophobic group or by modification with a compound having a (meth)acryloyl group. Examples of commercially available powder silica modified with a compound having a (meth)acryloyl group include AEROSIL RM 50 and R711 produced by Aerosil Japan, and examples of commercially available colloidal silica modified with a compound having an acryloyl group include MIBK-SD produced by Nissan Chemical Industries, Ltd.

The shape of the silica fine particles is not particularly limited and may be spherical, hollow, porous, rod-like, plate-like, fibrous, or irregularly shaped. An example of commercially available hollow silica fine particles is SiliNax produced by Nittetsu Mining Co., Ltd.

The primary particle size is preferably in the range of 5 to 200 nm. If the size is less than 5 nm, inorganic fine particles do not sufficiently disperse in the dispersion. At a size exceeding 200 nm, the cure product may not retain sufficient strength.

Not only extenders but also UV light responsive photocatalysts can be used as the titanium oxide fine particles. For example, anatase-type titanium oxide, rutile-type titanium oxide, and brookite-type titanium oxide can be used. Furthermore, particles designed to be responsive to visible light by doping crystal structures of titanium oxide with different elements can also be used. Preferred examples of the elements used as a dopant for titanium oxide include anion elements such as nitrogen, sulfur, carbon, fluorine, and phosphorus and cation elements such as chromium, iron, cobalt, and manganese. As for the form, a powder or a sol or slurry dispersed in an organic solvent or water may be used. Examples of commercially available powder titanium oxide fine particles include AEROSIL P-25 produced by Aerosil Japan, and ATM-100 produced by Tayca Corporation. Examples of commercially available slurry of titanium oxide fine particles include TKD-701 produced by Tayca Corporation.

In the inorganic fine particle dispersion liquid of the present invention, 5 to 90 wt % of inorganic fine particles can be blended relative to the solid content of the inorganic fine particle dispersion liquid. In particular, in order to impart wear resistance, the amount of the silica fine particles added is preferably 5 to 80 wt % and more preferably 10 to 70 wt % relative to the total solid content of the inorganic fine particle dispersion liquid of the present invention. At a content of 5 wt % or more, wear resistance is enhanced. However, at a content of 80 wt % or more, the cured product may not retain sufficient strength.

In order to impart photocatalytic activity, the amount of the titanium oxide fine particles relative to the total solid content of the inorganic fine particle dispersion liquid of the present invention is preferably 5 to 80 wt % and more preferably 30 to 70 wt %. At less than 5 wt %, the photocatalytic activity tends to be poor and at exceeding 80 wt %, the cured product may not retain sufficient strength.

The particle size of the inorganic particles dispersed in the cured film is not particularly limited but is preferably 5 to 200 nm and more preferably 10 nm to 100 nm. Here, "particle size" is measured by using a scanning electron microscope (TEM) or the like.

(Inorganic Fine Particle Dispersion Liquid)

An inorganic fine particle dispersion liquid in the present invention is a dispersion liquid that contains inorganic fine particles and an inorganic fine particle dispersant.

The method for dispersing inorganic fine particles by using the inorganic fine particle dispersant is not particularly limited and any known dispersion method may be employed. Examples of the mechanical means include a disper, a dispersion machine equipped with a stirring blade such as a turbine blade, a paint shaker, a roll mill, a ball mill, an attritor, a sand mill, and a bead mill. In order to produce an inorganic fine particle dispersion so that the resulting dispersion is used in a coating agent or the like, dispersing is preferably conducted with a bead mill that uses dispersion media such as glass beads and zirconia beads from the viewpoint of coatability, coating stability, transparency of cured products, etc.

Examples of the bead mill include Star Mill produced by Ashizawa Finetech Ltd.; MSC-MILL, SC-MILL, and attritor MA01SC produced by Mitsui Mining Co., Ltd.; nano grain mill, pico grain mill, pure grain mill, mechagaper grain mill, cera power grain mill, dual grain mill, AD mill, twin AD mill, basket mill, and twin basket mill produced by Asada Iron Works Co., Ltd.; and aspek mill, ultra aspek mill, and super aspek mill produced by Kotobuki Industries Co., Ltd. Among these, ultra aspek mill is preferred.

An inorganic fine particle dispersion liquid is preliminarily prepared by dispersing the compound resin (A) and inorganic fine particles used in the present invention by using a bead mill, a roll mill, or the like so that the inorganic fine particles are blended at a high concentration and the inorganic fine particle dispersion liquid is dispersed in a reactive compound, e.g., a reactive diluent such as polyisocyanate and an active energy ray-curable monomer. In this manner, a paint can be formed efficiently without risk of gelation. When the concentration of the dispersed inorganic fine particles here is within the range of 5 to 90 wt % relative to the total solid content of the inorganic fine particle dispersion liquid, a dispersion liquid having excellent storage stability capable of preventing precipitation, solidification, and the like of inorganic fine particles can be obtained.

The method for dispersing inorganic fine particles may be any. For example, 10 to 95 parts by weight of the compound resin (A) prepared by any of Methods 1 to 3 described above according to the present invention and 90 to 5 parts by weight of inorganic fine particles may be diluted with a dispersion medium so that the total concentration of the compound resin (A) and the inorganic fine particles is 1 to 50 wt % and the resulting mixture may be dispersed through mechanical means.

The average particle size of inorganic particles in the dispersion liquid prepared as such is not particularly limited but is preferably 5 to 200 nm and more preferably 10 nm to 100 nm. Here, the "average particle size" is calculated by using a particle size distribution analyzer that employs a dynamic light scattering method (ELS-Z produced by Otsuka Electronics Co., Ltd., cell width: 1 cm, diluting solvent: MEK) or the like.

A dispersion medium may be used in the inorganic fine particle dispersion liquid of the present invention to adjust the solid content and viscosity of the dispersion liquid.

The dispersion medium may be any liquid medium that does not impair the effects of the present invention and examples thereof include various organic solvents and liquid organic polymers.

Examples of the organic solvents include ketones such as acetone, methyl ethyl ketone (MEK), and methyl isobutyl ketone (MIBK), cyclic ethers such as tetrahydrofuran (THF) and dioxolane, esters such as methyl acetate, ethyl acetate, and butyl acetate, aromatic compounds such as toluene and xylene, and alcohols such as carbitol, cellosolve, methanol, isopropanol, butanol, and propylene glycol monomethyl ether. These may be used alone or in combination. Among these, methyl ethyl ketone is preferred from the viewpoints of volatility during coating and recovery of the solvent.

The liquid organic polymer mentioned above is a liquid organic polymer not directly contributing to curing reaction. Examples thereof include carboxyl-containing polymer modified product (Flowlen G-900 and NC-500 produced by Kyoeisha Chemical Co., Ltd.), acryl polymers (Flowlen WK-20 produced by Kyoeisha Chemical Co., Ltd.), amine salts of specially modified phosphates (HIPLAAD ED-251 produced by Kusumoto Chemicals, Ltd.), and modified acryl-based block copolymers (DISPER BYK 2000 produced by BYK-Chemie GmbH).

(Inorganic Fine Particle Dispersion)

In the present invention, an inorganic fine particle dispersion refers to a dispersion that contains inorganic fine particles, an inorganic fine particle dispersant, and a reactive compound.

(Reactive Compound)

A polymer or monomer that has a reactive group directly contributing to a curing reaction with the compound resin (A) can be used as the reactive compound that can be used in the present invention. In particular, a reactive diluent such as a polyisocyanate and an active energy ray-curable monomer is preferred.

According to an inorganic fine particle dispersion that uses a reactive compound and the compound resin (A) into which a reactive functional group is introduced, the compound resin (A) serving as a dispersant and the reactive diluent undergo three-dimensional crosslinking and thus the problems common to the practice of using dispersants, i.e., bleeding out of the dispersant and plasticization of cured products due to addition of dispersants, can be avoided, and a cured product that has excellent weatherability and wear resistance can be obtained.

When a polyisocyanate is used as the reactive compound, the vinyl-based polymer segment (a2) in the compound resin (A) preferably contains an alcoholic hydroxyl group. The polyisocyanate content relative to the total amount of the inorganic fine particle dispersion of the present invention is preferably 5 to 50 wt %. When the polyisocyanate is contained within this range, a cured product having particularly excellent long-term outdoor weatherability (crack resistance to be more specific) is obtained. This is presumably because hydroxyl groups (hydroxyl groups in the vinyl-based polymer segment (a2) described above or hydroxyl groups in the active energy ray-curable monomer having alcoholic hydroxyl groups described below) in the system react with the polyisocyanate to give urethane bonds, which are soft segments, and this leads to reducing the stress concentration caused by curing through polymerizable double bonds.

The polyisocyanate to be used is not particularly limited and a known polyisocyanate can be used. However, aromatic diisocyanates such as tolylene diisocyanate and diphenylmethane-4,4'-diisocyanate, and polyisocyanates whose main raw material is aralkyl diisocyanates such as meta-xylylene diisocyanate and α,α,α',α'-tetramethyl-meta-xylylene diisocyanate are preferably used in as small quantities as possible since yellowing of cured coatings occurs when the cured coatings are exposed outdoors for long time.

From the viewpoint of long-term outdoor use, the polyisocyanate used in the present invention is preferably an aliphatic polyisocyanate mainly composed of an aliphatic diisocyanate. Examples of the aliphatic diisocyanate include tetramethylene diisocyanate, 1,5-pentamethylene diisocyanate, 1,6-hexamethylene diisocyanate (hereinafter referred to as "HDI"), 2,2,4- (or 2,4,4-trimethyl-1,6-hexamethylene diisocyanate, lysine isocyanate, isophorone diisocyanate, hydrogenated xylene diisocyanate, hydrogenated diphenyl methane diisocyanate, 1,4-diisocyanate cyclohexane, 1,3-bis(diisocyanatemethyl)cyclohexane, and 4,4'-dicyclohexylmethane diisocyanate. Among these, HDI is particularly preferred form the viewpoints of crack resistance and cost.

Examples of the aliphatic polyisocyanate obtained from an aliphatic diisocyanate include allophanate-type polyisocyanates, biuret-type polyisocyanates, adduct-type polyisocyanates, and isocyanurate-type polyisocyanates. All of these are preferred for use.

A block polyisocyanate compound in which blocks are formed by using any of various types of block agents may be used as the polyisocyanate. Examples of the block agent include alcohols such as methanol, ethanol, and lactates; phenolic hydroxyl group-containing compounds such as phenol and salicylates; amides such as ε-caprolactam and 2-pyrrolidone; oximes such as acetone oxime and methyl ethyl ketoxime; and active methylene compounds such as methyl acetoacetate, ethyl acetoacetate, and acetyl acetone.

The isocyanate group content in the polyisocyanate is preferably 3 to 30 wt % from the viewpoints of crack resistance and wear resistance of a cured coating obtained from a paint. When the isocyanate group content in the polyisocyanate is more than 30%, the molecular weight of the polyisocyanate is decreased and the crack resistance due to stress relaxation may not be exhibited.

The reaction between the polyisocyanate and hydroxyl groups in the system (these hydroxyl groups are hydroxyl groups in the vinyl-based polymer segment (a2) or hydroxyl groups in the active energy ray-curable monomer having alcoholic hydroxyl groups described below) does not require heating or the like and the reaction gradually proceeds when the system is left at room temperature. If needed, the system may be heated at 80° C. for several minutes to several hours (20 minutes to 4 hours) so as to accelerate the reaction between the alcoholic hydroxyl groups and the isocyanate. In such a case, a known urethanation catalyst may be used as needed. The urethanation catalyst is appropriately selected according to the desired reaction temperature.

When an active energy ray-curable monomer is used as the reactive compound, a multifunctional (meth)acrylate is preferably contained. The multifunctional (meth)acrylate is not particularly limited and a known multifunctional (meth)acrylate can be used. Examples thereof include multifunctional (meth)acrylates having two or more polymerizable double bonds in a molecule, such as 1,2-ethanediol diacrylate, 1,2-propanediol diacrylate, 1,4-butanediol diacrylate, 1,6-hexanediol diacrylate, dipropylene glycol diacrylate, neopentyl glycol diacrylate, tripropylene glycol diacrylate, trimethylolpropane diacrylate, trimethylolpropane triacrylate, tris(2-acryloyloxy)isocyanurate, pentaerythritol triacrylate, pentaerythritol tetraacrylate, di(trimethylolpropane) tetraacrylate, di(pentaerythritol)pentaacrylate, and di(pentaerythritol) hexaacrylate. Urethane acrylate, polyester acrylate, epoxy acrylate, and the like are also examples of the multifunctional acrylate. These may be used alone or in combination.

For example, when the polyisocyanate described above is used in combination, acrylates having hydroxyl groups such as pentaerythritol triacrylate and dipentaerythritol pentaacrylate are preferred. In order to further increase the crosslinking density, use of (meth)acrylates having a high functionality, such as di(pentaerythritol)pentaacrylate and di(pentaerythritol) hexaacrylate, is also effective.

A monofunctional (meth)acrylate can also be used in combination with the multifunctional (meth)acrylate. Examples thereof include hydroxyl-group-containing (meth)acrylates such as hydroxyethyl(meth)acrylate, hydroxypropyl(meth) acrylate, hydroxybutyl(meth)acrylate, caprolactone-modified hydroxy(meth)acrylate (e.g., "PLACCEL", trade name, produced by Daicel Corporation), mono(meth)acrylate of a polyester diol obtained from phthalic acid and propylene glycol, mono(meth)acrylate of a polyester diol obtained from succinic acid and propylene glycol, polyethylene glycol mono(meth)acrylate, polypropylene glycol mono(meth) acrylate, pentaerythritol tri(meth)acrylate, 2-hydroxy-3-(meth)acryloyloxypropyl(meth)acrylate, and (meth)acrylate adducts of various epoxy esters; carboxyl-group-containing vinyl monomers such as (meth)acrylic acid, crotonic acid, itaconic acid, maleic acid, and fumaric acid; sulfonic acid group-containing vinyl monomers such as vinyl sulfonic acid, styrene sulfonic acid, and sulfoethyl(meth)acrylate; acidic phosphate-based vinyl monomers such as 2-(meth) acryloyloxyethyl acid phosphate, 2-(meth)acryloyloxypropyl acid phosphate, 2-(meth)acryloyloxy-3-chloro-propyl acid phosphate, and 2-methacryloyloxyethylphenyl phosphoric acid; and methylol-group-containing vinyl monomers such as N-methylol(meth)acrylamide. These may be used alone or in combination. Considering the reactivity to the isocyanate groups in the polyfunctional isocyanate (b), the monomer (c) is preferably a hydroxyl group-containing (meth)acrylic acid ester.

The amount of the multifunctional acrylate used is preferably 1 to 85 wt % and more preferably 5 to 80 wt % relative to the total solid content of the inorganic fine particle dispersion. When the multifunctional acrylate is used within this range, physical properties such as hardness of the resulting layer can be improved.

As for the method for dispersing the reactive compound in a dispersion liquid containing the compound resin (A) and the inorganic fine particles, i.e., the inorganic fine particle dispersion liquid, dispersing can be smoothly carried out by stirring by hand or with a known stirring machine such as disper or a homomixer. When the viscosity is high, a dispersion medium described above may be appropriately added.

(Inorganic Fine Particle Dispersion—other Blend Materials)

The inorganic fine particle dispersion of the present invention may use a dispersion medium to adjust the solid content and viscosity of the dispersion liquid. The dispersion medium may be any liquid medium that does not impair the effects of the present invention and examples thereof include the organic solvents and liquid organic polymers described above.

The inorganic fine particle dispersion of the present invention can be cured by an active energy ray if the compound resin (A) contains a group having a polymerizable double bond described above. Examples of the active energy ray include UV light emitted from light sources such as a xenon lamp, a low-pressure mercury lamp, a high-pressure mercury lamp, an ultrahigh pressure mercury lamp, a metal halide lamp, a carbon arc lamp, and a tungsten lamp, and an electron beam, an α ray, a β ray, and a γ ray typically output from a particle accelerator at 20 to 2000 kV. In particular, UV light or an electron beam is preferably used. UV light is particularly preferable. Examples of the UV ray source include sunlight, a low-pressure mercury lamp, a high-pressure mercury lamp, an ultrahigh pressure mercury lamp, a carbon arc lamp, a metal halide lamp, a xenon lamp, an argon laser, and a helium cadmium laser. A layer of the inorganic fine particle dispersion formed by application can be cured by irradiation of a UV ray having a wavelength of about 180 to 400 nm emitted from any of these devices. The dose of the UV light is appropriately selected according to the type and amount of the photopolymerization initiator used.

Curing with an active energy ray is particularly effective when the substrate is composed of a material such as plastic having low heat resistance. In the case where heat is also used to an extent that does not adversely affect the substrate, a known heat source such as hot air or near infrared rays can be used.

When a UV ray is used to conduct curing, a photopolymerization initiator is preferably used. A known photopolymerization initiator may be used. For example, at least one selected from the group consisting of an acetophenone, a benzyl ketal, and a benzophenone is preferably used.

Examples of the acetophenone include diethoxy acetophenone, 2-hydroxy-2-methyl-1-phenylpropan-1-one, 1-(4-isopropylphenyl)-2-hydroxy-2-methylpropan-1-one, and 4-(2-hydroxyethoxy)phenyl-(2-hydroxy-2-propyl) ketone. Examples of the benzyl ketal include 1-hydroxycyclohexyl-phenyl ketone and benzyl dimethyl ketal. Examples of the benzophenone include benzophenone, and methyl o-benzoylbenzoate. Examples of the benzoin include benzoin, benzoin methyl ether, and benzoin isopropyl ether. The photopolymerization initiators (B) may be used alone or in combination.

The amount of the photopolymerization initiator (B) is preferably 1 to 15 wt % and more preferably 2 to 10 wt % relative to 100 wt % of the compound resin (A).

When the inorganic fine particle dispersion of the present invention is to be thermally cured, various catalysts are preferably selected by considering the reaction temperature, reaction time, etc., of the reaction of the polymerizable double bonds in the composition and the urethanation reaction between alcoholic hydroxyl groups and the isocyanate.

Moreover, it is possible to additionally use a thermosetting resin. Examples of the thermosetting resin include vinyl-based resins, unsaturated polyester resins, polyurethane resins, epoxy resins, epoxy ester resins, acrylic resins, phenolic resins, petroleum resins, ketone resins, silicone resins, and modified resins of the foregoing.

In addition, if needed, various additives such as an inorganic pigment, an organic pigment, an extender, a clay mineral, a wax, a surfactant, a stabilizer, a flow controller, a dye, a leveling agent, a rheology controller, a silane coupling agent, a UV absorber, an antioxidant, and a plasticizer can be used.

The inorganic fine particle dispersion as is can be used as a paint curable with a UV ray or the like. The inorganic fine particle dispersion may be blended with an additive such as an organic pigment or an inorganic pigment to prepare a paint. When this paint is cured with a UV ray or the like, a cured product such as a cured coating film or a laminate can be obtained.

When a cured film is formed by curing the inorganic fine particle dispersion or paint of the present invention, the thickness of the cured film is not particularly limited but is preferably 0.1 to 300 μm from the viewpoint of forming a cured coating film having long-term outdoor weatherability and excellent wear resistance. When the thickness of the cured coating film is less than 0.1 μm, weatherability and the wear resistance cannot be imparted to the plastic material. If the thickness is more than 300 μm, the interior of the coating film is not sufficiently irradiated with the UV ray and curing failure may occur.

A coated product having a cured coating film having excellent weatherability and wear resistance can be obtained by applying the inorganic fine particle dispersion or paint of the present invention containing a photopolymerization initiator and the like and irradiating the applied dispersion or paint with a UV ray.

A cured coating film having coating film properties similar to when UV irradiation is conducted in the presence of a photopolymerization initiator can be obtained by irradiation with an intense energy ray such as an electron beam without using the initiator.

Various substrates can be used as the substrate. For example, a metal substrate, an inorganic substrate, a plastic substrate, paper, or a wood substrate may be used.

For example, in order to form a layer formed of the inorganic fine particle dispersion on a plastic substrate surface, a coating method is typically employed although the method is not limited to this. In particular, after applying the inorganic fine particle dispersion to the plastic substrate surface, the applied dispersion is irradiated with ultraviolet light. As a result, a plastic formed body having a cured coating film with excellent weatherability and wear resistance can be obtained.

In this case, in order to control rheology, the inorganic fine particle dispersion is preferably appropriately diluted with a solvent in addition to containing the additives described above. Although the solvent is not particularly limited, use of aromatic hydrocarbons such as toluene and xylene is preferably avoided considering the working environment in plants during the production.

The thickness of the film after coating is also not particularly limited. From the viewpoint of forming a cured coating film that has excellent long-term outdoor weatherability and excellent wear resistance, the thickness if preferably 0.1 to 300 μm. When the thickness of the cured coating film is less than 0.1 μm, weatherability and wear resistance cannot be imparted to the plastic material. If the thickness is more than 300 μm, the interior of the coating film may not be sufficiently irradiated with UV light and curing failure may occur.

Examples of the material for the plastic substrate include polyolefins such as polyethylene polypropylene, and ethylene-propylene copolymers; polyesters such as polyethylene isophthalate, polyethylene terephthalate, polyethylene naphthalate, and polybutylene terephthalate; polyamides such as nylon 1, nylon 11, nylon 6, nylon 66, and nylon MX-D; styrene-based polymers such as polystyrene, styrene-butadiene block copolymers, styrene-acrylonitrile copolymers, and styrene-butadiene-acrylonitrile copolymers (ABS resin); acrylic polymers such as polymethyl methacrylate and methyl methacrylate-ethyl acrylate copolymers; and polycarbonates. The plastic substrate may be a single layer or have a multilayer structure including two or more layers. These plastic substrates may be unstretched, uniaxially stretched, or biaxially stretched.

The plastic substrate may contain known additives such as known an antistatic agent, an antifogging agent, an antiblocking agent, a UV absorber, an antioxidant, a photostabilizer, a nucleating agent, and a lubricant as long as the effects of the present invention are not obstructed.

The plastic substrate may have a surface treated by a known surface treatment in order to further improve the adhesion to the inorganic fine particle dispersion of the present invention. Examples of the surface treatment include a corona discharge treatment, a plasma treatment, a flame plasma treatment, an electron beam irradiation treatment, and UV light irradiation treatment. One of these treatments or a combination of two or more of these treatments may be conducted.

The substrate may have any shape, for example, a sheet-shape, a plate-shape, a spherical shape, or a film-shape or the substrate may be a large building structure or an assembled structure or formed structure having a complicated shape. The surface of the substrate may be coated with an undercoat paint or the like. It is possible to apply the inorganic fine particle dispersion of the present invention even when the portions coated as such are deteriorated.

A known water-soluble or water-dispersible paint or an organic solvent-type or organic solvent dispersive-type paint or powder paint can be used as the undercoat paint. In particular, various types of undercoat paints such as acrylic resin-based paints, polyester resin-based paints, alkyd resin-based paints, epoxy resin-based paints, aliphatic acid-modified epoxy resin-based paints, silicone resin paints, polyurethane resin-based paints, fluoroolefin-based paints, and amine-modified epoxy resin paints can be used. The undercoat paint may be a clear paint free of pigments, an enamel paint containing a pigment, or a metallic paint containing aluminum flakes or the like.

A commonly known coating method may be used as the method for coating the substrate with the inorganic fine particle dispersion or paint of the present invention. Examples thereof include a brushing method, a roller coating method, a spray coating method, a dip coating method, a flow coater method, a roll coater method, and an electropainting method.

After the inorganic fine particle dispersion is applied to the substrate surface by the coating method described above, the coated surface is irradiated with UV light by the method described above so as to obtain a coated product having a cured coating film having excellent long-term outdoor weatherability, excellent wear resistance, and high adhesion to plastic materials.

EXAMPLES

Next, the present invention is more specifically described by using Examples and Comparative Examples. In the examples, "parts" and "%" are on a weight basis unless otherwise noted.

Synthetic Example 1

Example of Preparing Polysiloxane

Into a reactor equipped with a stirrer, a thermometer, a dropping funnel, a cooling tube, and a nitrogen gas inlet port, 415 parts of methyltrimethoxysilane (MTMS) and 756 parts of 3-methacryloyloxypropyltrimethoxysilane (MPTS) were charged, and the resulting mixture was heated to 60° C. under stirring and a nitrogen gas stream. Thereto, a mixture of 0.1 parts of "A-3" [iso-propyl acid phosphate produced by Sakai Chemical Industry Co., Ltd.] and 121 parts of deionized water was added dropwise for 5 minutes. After completion of the dropwise addition, the interior of the reactor was heated to 80° C. and stirring was conducted for 4 hours to carry out a hydrolytic condensation reaction. As a result, a reaction product was obtained.

Methanol and water contained in the reaction product were removed under a reduced pressure of 1 to 30 kilopascal (kPa) under a condition of 40 to 60° C. As a result, 1000 parts of a polysiloxane (a1) having a number-average molecular weight of 1000 and an active content of 75.0% was obtained.

Note that the "active content" is calculated by dividing the theoretical yield (parts by weight) in the case where all of the methoxy groups in the silane monomer used had undergone hydrolytic condensation reactions by the actual yield (parts by weight) after the hydrolytic condensation reaction, i.e., [theoretical yield (parts by weight) in the case where all of the methoxy groups in the silane monomer had undergone hydrolytic condensation reactions/actual yield (parts by weight) after the hydrolytic condensation reaction].

Synthetic Example 2

Example of Preparing Compound Resin (A-1)

Into a reactor the same as that in Synthetic Example 1, 20.1 parts of phenyltrimethoxysilane (PTMS), 24.4 parts of dimethyldimethoxysilane (DMDMS), and 107.7 parts of n-butyl acetate were charged and the resulting mixture was heated to 80° C. under stirring and a nitrogen gas stream. A mixture of 15 parts of methyl methacrylate (MMA), 45 parts of n-butyl methacrylate (BMA), 39 parts of 2-ethylhexyl methacrylate (EHMA), 1.5 parts of acrylic acid (AA), 4.5 parts of MPTS, 45 parts of 2-hydroxyethyl methacrylate (HEMA), 15 parts of n-butyl acetate, and 15 parts of tert-butylperoxy-2-ethylhexanoate (TBPEH) was added dropwise to the reactor for 4 hours at the same temperature under stirring and a nitrogen gas stream. After further conducting stirring for 2 hours at the same temperature, a mixture of 0.05 parts of "A-3" and 12.8 parts of deionized water was added to the reactor dropwise for 5 minutes and stirring was conducted for 4 hours at the same temperature to allow a hydrolytic condensation reaction to proceed among PTMS, DMDMS, and MPTS. The reaction product was analyzed by $^1$H-NMR and it was found that nearly 100% of the trimethoxysilyl groups of the silane monomer in the reactor had hydrolyzed. Next, stirring was conducted for 10 hours at the same temperature. As a result, a reaction product having a TBPEH remaining amount of 0.1% or less was obtained. The amount of the remaining TBPEH was measured by iodometry.

To the reaction product, 162.5 parts of polysiloxane (a1) obtained in Synthetic Example 1 was added, the mixture was stirred for 5 minutes, 27.5 parts of deionized water was added thereto, and stirring was conducted for 4 hours at 80° C. to allow a hydrolytic condensation reaction to proceed between the reaction product and the polysiloxane. The resulting reaction product was distilled at a reduced pressure of 10 to 300 kPa under a condition of 40 to 60° C. to remove methanol and water generated, and then 150 parts of methyl ethyl ketone (hereinafter referred to as MEK) and 27.3 parts of n-butyl acetate were added thereto. As a result, 600 parts (solid content: 50.0%) of a compound resin (A-1) solution constituted by a polysiloxane segment and a vinyl polymer segment in which the polysiloxane segment (a1) content was 50 wt % was obtained.

Synthetic Example 3

Example of Preparing Compound Resin (A-2)

Into a reactor the same as that in Synthetic Example 1, 20.1 parts of PTMS, 24.4 parts of DMDMS, and 107.7 parts of n-butyl acetate were charged and the resulting mixture was heated to 80° C. under stirring and a nitrogen gas stream. Then a mixture containing 15 parts of MMA, 45 parts of BMA, 39 parts of EHMA, 1.5 parts of AA, 4.5 parts of MPTS, 45 parts of HEMA, 15 parts of n-butyl acetate, and 15 parts of TBPEH was added to the reactor dropwise for 4 hours at the same temperature under stirring and nitrogen gas stream. After further conducting stirring for 2 hours at the same temperature, a mixture of 0.05 parts of "A-3" and 12.8 parts of deionized water was added thereto dropwise for 5 minutes and stirring was conducted for 4 hours at the same temperature to allow a hydrolytic condensation reaction to proceed among PTMS, DMDMS, and MPTS. The reaction product was analyzed by $^1$H-NMR and it was found that nearly 100% of the trimethoxysilyl groups of the silane monomer in the reactor had hydrolyzed. Next, stirring was conducted for 10 hours at the same temperature. As a result, a reaction product having a TBPEH remaining amount of 0.1% or less was obtained. The amount of the remaining TBPEH was measured by iodometry.

To the reaction product, 562.5 parts of the polysiloxane (a1) obtained in Synthetic Example 1 was added, stirring was conducted for 5 minutes, 80.0 parts of deionized water was added thereto, and stirring was conducted for 4 hours at 80° C. to allow a hydrolytic condensation reaction to proceed between the reaction product and the polysiloxane. The resulting reaction product was distilled for 2 hours at a reduced pressure of 10 to 300 kPa under a condition of 40 to 60° C. to remove methanol and water generated, and then 128.6 parts of MEK and 5.8 parts of n-butyl acetate were added. As a result, 857 parts of a compound resin (A-2) having a polysiloxane segment (a1) content of 75 wt % and a nonvolatile content of 70.0% and being constituted by a polysiloxane segment and a vinyl polymer segment was obtained.

Synthetic Example 4

Example of Preparing Compound Resin (A-3)

Into a reactor the same as that in Synthetic Example 1, 17.6 parts of PTMS, 21.3 parts of DMDMS, and 129.0 parts of n-butyl acetate were charged and the resulting mixture was heated to 80° C. under stirring and a nitrogen gas stream. To the reactor, a mixture of 21 parts of MMA, 63 parts of BMA, 54.6 parts of EHMA, 2.1 parts of AA, 6.3 parts of MPTS, 63 parts of HEMA, 21 parts of n-butyl acetate, and 21 parts of TBPEH was added dropwise for 4 hours at the same temperature under stirring and a nitrogen gas stream. After further conducting stirring for 2 hours at the same temperature, a mixture of 0.04 parts of "A-3" and 11.2 parts of deionized water was added to the reactor dropwise for 5 minutes and stirring was conducted for 4 hours at the same temperature to allow a hydrolytic condensation reaction to proceed among PTMS, DMDMS, and MPTS. The reaction product was analyzed by $^1$H-NMR and it was found that nearly 100% of the trimethoxysilyl groups of the silane monomer in the reactor had hydrolyzed. Next, stirring was conducted for 10 hours at the same temperature. As a result, a reaction product having a TBPEH remaining amount of 0.1% or less was obtained. The amount of the remaining TBPEH was measured by iodometry.

To the reaction product, 87.3 parts of the polysiloxane (a1) obtained in Synthetic Example 1 was added, the mixture was stirred for 5 minutes, 12.6 parts of deionized water was added thereto, and stirring was conducted for 4 hours at 80° C. to allow a hydrolytic condensation reaction to proceed between the reaction product and the polysiloxane. The resulting reaction product was distilled for 2 hours at a reduced pressure of 10 to 300 kPa under a condition of 40 to 60° C. to remove methanol and water generated, and then 150 parts of MEK was added thereto. As a result, 600 parts of a compound resin (A-3) having a polysiloxane segment (a1) content of 30 wt % and a nonvolatile content of 50.0% and being constituted by a polysiloxane segment and a vinyl polymer segment was obtained.

Example 1

Inorganic Fine Particle Dispersion—Preparation of Dispersion Liquid 1

The compound resin (A-1) solution (100 parts) (50 parts on a solid basis) prepared in Synthetic Example 2, 50 parts of silica fine particles (AEROSIL 50 produced by Aerosil Japan, average primary particle size: about 30 nm), and 350 parts of methyl isobutyl ketone (hereinafter referred to as MIBK) were blended.

The silica fine particles in the mixture were dispersed with Ultra Apex Mill UAM 015 produced by Kotobuki Industries Co., Ltd. In preparing the dispersion, zirconia beads having a diameter of 30 μm were charged as the media in the mill so that the volume of the zirconia beads was 50% of the volume of the mill. Closed-circuit crushing was conducted on the mixture at a flow rate of 1.5 L per minute. The closed-circuit crushing was conducted for 30 minutes. As a result, a dispersion liquid in which silica fine particles were dispersed in the mixture of the compound resin (A-1) and the dispersion medium was obtained. The obtained dispersion liquid was discharged from the outlet of Ultra Apex Mill UAM 015, the concentration of the dispersion medium was adjusted by using an evaporator, and a dispersion liquid 1 (solid content: 50%) of the silica fine particles was obtained.

The silica dispersion liquid 1 was stored at room temperature (25° C.) for 2 months. Precipitates were not generated, the viscosity did not increase, and the storage stability was high.

Examples 2 to 4

Inorganic Fine Particle Dispersion
Liquid—Preparation of Dispersion Liquids 2 to 4

Dispersion liquids 2 to 4 having a solid content of 50% were obtained as in preparation of dispersion liquid 1 based on the blend examples shown in Table 1.

The silica dispersion liquids 2 to 4 were stored at room temperature (25° C.) for 2 months. Precipitates were not generated, the viscosity did not increase, and the storage stability was high.

Example 5

Inorganic Fine Particle Dispersion
Liquid—Preparation of Dispersion Liquid 5

The compound resin (A) (100 parts) (50 parts on a solid basis), 100 parts of titanium oxide fine particles (P-25 produced by Aerosil Japan, anatase/rutile mixed crystal titanium oxide, average primary particle size: about 12 nm) and 550 parts of isopropyl alcohol (hereinafter referred to as IPA) were blended.

The silica fine particles in the mixture were dispersed with Ultra Apex Mill UAM 015 produced by Kotobuki Industries Co., Ltd. In preparing the dispersion liquid, zirconia beads having a diameter of 30 μm were charged as the media in the mill so that the volume of the zirconia beads was 50% of the volume of the mill. Closed-circuit crushing was performed on the mixture at a flow rate of 1.5 L per minute. The closed-circuit crushing was conducted for 30 minutes and a dispersion liquid in which the titanium oxide fine particles were dispersed in the mixture of the compound resin (A-1) and IPA was obtained. The obtained dispersion liquid was discharged from the outlet of Ultra Apex Mill UAM 015, the dispersion medium concentration was adjusted by using an evaporator, and a titanium oxide dispersion liquid having a solid content of 50% was obtained as a result.

The titanium oxide dispersion liquid 5 was stored at room temperature (25° C.) for 2 months. Precipitates were not generated, the viscosity did not increase, and the storage stability was high.

Examples 6 and 7

Inorganic Fine Particle Dispersion
Liquid—Preparation of Dispersion Liquid 6 and
Dispersion liquid 7

Dispersion liquids 6 and 7 having a solid content of 50% were obtained as in preparation of dispersion liquid 1 based on the blend examples shown in Table 2.

The silica dispersion liquids 6 and 7 were stored at room temperature (25° C.) for 2 months. Precipitates were not generated, the viscosity did not increase, and the storage stability was high.

TABLE 1

|  |  | Example 1 Dispersion liquid 1 | Example 2 Dispersion liquid 2 | Example 3 Dispersion liquid 3 | Example 4 Dispersion liquid 4 | Example 5 Dispersion liquid 5 |
|---|---|---|---|---|---|---|
| Compound resin (A-1) (solid basis) |  | 50 | 23 | 50 | 50 | 50 |
| (MIBK) |  | (350) | (350) | (350) | (350) | — |
| (IPA) |  | — | — | — | — | (550) |
| Silica fine particles | Aerosil 50 | 50 | 77 | — | — | — |
|  | Aerosil 200 | — | — | 50 | — | — |
|  | Aerosil R711 | — | — | — | 50 | — |
| Titanium oxide fine particles | P-25 | — | — | — | — | 100 |
| Dispersibility (average particle size, nm) |  | 90 | 100 | 80 | 75 | 70 |
| Storage stability (25° C., 2 months) |  | Good | Good | Good | Good | Good |

TABLE 2

|  |  | Example 6 Dispersion liquid 6 | Example 7 Dispersion liquid 7 |
|---|---|---|---|
| Compound resin (A-2) (solid basis) |  | 50 | — |
| Compound resin (A-3) (solid basis) |  | — | 50 |
| (MIBK) |  | (350) | (350) |
| (IPA) |  | — | — |
| Silica fine particles | Aerosil 50 | 50 | 50 |
|  | Aerosil 200 | — | — |
|  | Aerosil R711 | — | — |
| Titanium oxide fine particles | P-25 | — | — |
| Dispersibility (average particle size, nm) |  | 80 | 100 |
| Storage stability (25° C., 2 months) |  | Good | Good |

Legend in Tables 1 and 2
MIBK: methyl isobutyl ketone
Aerosil 50: [silica fine particles produced by Aerosil Japan, average primary particle size: about 30 nm]
Aerosil 200: [silica fine particles produced by Aerosil Japan, average primary particle size: about 12 nm]
Aerosil R711: [methacryloyl-group-modified silica fine particles produced by Aerosil Japan, average primary particle size: about 12 nm]
P-25: [titanium oxide fine particles produced by Aerosil Japan, average primary particle size: about 12 nm]
Measurement of Dispersibility (Average Particle Size)
After the inorganic fine particle dispersion liquids were prepared, the dispersibility was measured with a particle size distribution analyzer employing a dynamic light scattering method (ELS-Z produced by Otsuka Electronics Co., Ltd., cell width: 1 cm, diluting solvent: MEK.

Example 8

Preparation of Paint 1

To 121.4 parts of the dispersion liquid 1, 24.3 parts of pentaerythritol triacrylate (PETA) serving as a reactive compound, 15 parts of Burnock DN-902S [polyisocyanate produced by DIC Corporation], 3.35 parts of Irgacure 184 [photopolymerization initiator produced by Ciba Japan K.K.], 3.94 parts of Tinuvin 400 [hydroxyphenyl triazine-based UV absorber produced by Ciba Japan K.K.], 1.0 parts of Tinuvin 123 [hindered amine-based light stabilizer (HALS) produced by Ciba Japan K.K.], and 8.4 parts of ethyl acetate were added to obtain an inorganic fine particle dispersion 1 having a solid content of 60%. This inorganic fine particle dispersion 1 was used as a paint 1. The paint 1 had good fluidity.

Examples 9 to 12

Preparation of Paints 2 to 5

Inorganic fine particle dispersions 2 to 5 and paints 2 to 5 were obtained as in the preparation of the inorganic fine particle dispersion 1 and the paint 1 based on the blend examples shown in Table 3. The paints 2 to 5 exhibited good fluidity.

Example 13

Preparation of Paint 6

To 141.1 parts of the dispersion liquid 5, 14.3 parts of pentaerythritol triacrylate (PETA) serving as a reactive compound, 3.35 parts of Irgacure 184 [photopolymerization initiator produced by Ciba Japan K.K.], 3.94 parts of Tinuvin 400 [hydroxyphenyl triazine-based UV absorber produced by Ciba Japan K.K.], and 1.0 parts of Tinuvin 123 [hindered amine-based light stabilizer (HALS) produced by Ciba Japan K.K.] were added to obtain an inorganic fine particle dispersion 6 having a solid content of 57%. The inorganic fine particle dispersion 6 was used as a paint 6. The paint 6 had good fluidity.

Comparative Example 1

Preparation of Comparative Paint, CP-1

To 90.6 parts of the compound resin (A-1) solution prepared in Synthetic Example 2, 1.81 parts of Irgacure 184 [photopolymerization initiator produced by Ciba Japan K.K.], 2.19 parts of Tinuvin 400 [hydroxyphenyl triazine-based UV absorber produced by Ciba Japan K.K.], 0.55 parts of Tinuvin 123 [hindered amine-based light stabilizer (HALS) produced by Ciba Japan K.K.], and 9.4 parts of Burnock DN-9025 [polyisocyanate produced by DIC Corporation] were added to obtain a comparative paint CP-1 (solid content: 55%).

a sunshine weatherometer and is a test method for substances that are intended for long-term outdoor use.

[Haze]

The degree of deterioration of a film having a cured layer in the accelerated weathering test through metal weathering was quantified into numbers in terms of haze. Typically, haze is

TABLE 3

|  | Example 8 Paint 1 | Example 9 Paint 2 | Example 10 Paint 3 | Example 11 Paint 4 | Example 12 Paint 5 | Example 13 Paint 6 | Comparative Example 1 CP-1 |
|---|---|---|---|---|---|---|---|
| Dispersion liquid 1 | 121.4 | 181.2 | 0 | 0 | 0 | 0 | 0 |
| Dispersion liquid 2 | 0 | 0 | 181.2 | 0 | 0 | 0 | 0 |
| Dispersion liquid 3 | 0 | 0 | 0 | 121.4 | 0 | 0 | 0 |
| Dispersion liquid 4 | 0 | 0 | 0 | 0 | 121.4 | 0 | 0 |
| Dispersion liquid 5 | 0 | 0 | 0 | 0 | 0 | 141.1 | 0 |
| Compound resin (A-1) solution | 0 | 0 | 0 | 0 | 0 | 0 | 90.6 |
| PETA | 24.3 | 0 | 0 | 24.3 | 24.3 | 14.3 | 0 |
| I-184 | 3.35 | 3.35 | 3.35 | 3.35 | 3.35 | 3.35 | 1.81 |
| Tinuvin 400 | 3.94 | 3.94 | 3.94 | 3.94 | 3.94 | 3.94 | 2.19 |
| Tinuvin 123 | 1.00 | 1.00 | 1.00 | 1.00 | 1.00 | 1.00 | 0.55 |
| Ethyl acetate | 8.4 | 0 | 0 | 8.4 | 8.4 | 0 | 0 |
| DN-902S | 15 | 9.4 | 9.4 | 15 | 15 | 0 | 9.4 |
| Silica fine particle content (%) | 30 | 45.3 | 67.8 | 30 | 30 | 0 | 0 |
| Titanium oxide fine particle content (%) | 0 | 0 | 0 | 0 | 0 | 47 | 0 |

Legend in Table 3
PETA: pentaerythritol triacrylate
DN-902S: Burnock DN-901S [polyisocyanate produced by DIC corporation]
I-184: Irgacure 184 [photopolymerization initiator produced by Ciba Japan K.K.]
Tinuvin 400: [hydroxyphenyl triazine-based UV absorber produced by Ciba Japan K.K.]
Tinuvin 123: [hindered amine-based light stabilizer (HALS) produced by Ciba Japan K.K.]

Examples 14 to 19 and Comparative Example 2

Method for Forming a Cured Layer

Each of the paints 1 to 6 and the CP-1 prepared on the basis of the blend examples shown in Table 3 was applied to a substrate which was a PET film (haze: 0.5%) 210 mm×295 mm×0.125 mm in size so that the film thickness after drying was 10 μm. The applied paint was dried at 80° C. for 4 minutes to form a resin composition layer and then irradiated with a UV ray at about 1000 mJ/cm2 dose using a mercury lamp having a lamp output of 1 kW. The resulting layer was left at 40° C. for 3 days and a cured layer was obtained as a result.
<Methods for Measuring Physical Properties>
[Surface Mechanical Properties. Crack Resistance (MW)]

An accelerated weathering test was conducted through a metal weather test (MW) by using DMW produced by Daipla Wintes Co., Ltd., and unexposed specimens and specimens after 120 hours were compared and evaluated by visual observation. Specimens which did not undergo changes in surface conditions and the like were rated "Good", specimens having cracks in some part were rated as "Fair", and specimens having cracks in all parts of the surface were rated "Poor". It should be noted that this evaluation method uses conditions severer than those of the accelerated weathering test that uses calculated from the following equation (unit is %) by measuring the light transmittance of a test piece with a haze meter:

$Th = Td/Tt$ (where $Td$ represents diffuse light transmittance and $Tt$ represents total light transmittance) [Math. 1]

The difference between the haze (%) of a film having a cured layer after 120 hours and the haze (%) of an untested film having a cured layer was indicated as the difference in haze ΔH(%). The larger the difference, the severer the deterioration of the film having a cured layer.
[Wear Resistance]

A surface of a film having a cured layer was rubbed in accordance with JIS R3212 in a Taber's abrasion resistance test (abrasive wheel: CS-10F, load: 500 g, number of rotations: 100). The change in haze from the initial state, i.e., haze change ΔH (%) is measured. The smaller the difference, the higher the wear resistance.
[Pencil Hardness]

A surface of a film having a cured layer was subjected to a pencil scratch test under a 500 g load in accordance with JIS K 5400.
[Photocatalytic Activity Test (1): Measurement of Water Contact Angle]

In accordance with a self-cleaning performance test set forth in JIS R 1703-1 (2007), a test specimen without oleic acid coating was irradiated with UV light and the limit contact angle of the specimen before and after elapse of 3000 hours of sunshine weatherometer testing was measured. The smaller the limit contact angle, the higher the photocatalytic activity.

[Photocatalytic Activity Test (2): Decomposition of Wet Methylene Blue]

The coefficient for decomposition of methylene blue was calculated from a test specimen before and after 3000 hours of sunshine weatherometer testing in accordance with JIS R 1703-2 (2007).

The larger the decomposition coefficient, the higher the photocatalytic activity.

The results of evaluation of Examples 14 to 19 and Comparative Example 2 are shown in Tables 4 and 5.

TABLE 4

|  |  | Example 14 | Example 15 | Example 16 | Example 17 | Example 18 | Example 19 | Comparative Example 2 |
|---|---|---|---|---|---|---|---|---|
| Name of paint |  | Paint 1 | Paint 2 | Paint 3 | Paint 4 | Paint 5 | Paint 6 | Paint CP-1 |
| Weathering test | Crack resistance | Good | Good | Good | Good | Good | Good | Good |
|  | Haze ($\Delta H$) | 0.8 | 0.7 | 1.0 | 0.9 | 0.6 | 1.0 | 0.8 |
| Wear resistance test | Wear resistance ($\Delta H$) | 3.2 | 2.9 | 1.8 | 3.1 | 2.7 | 4.0 | 10.0 |
| Surface hardness | Pencil hardness | 2H | 2H | 3H | 2H | 2H | H | F |

TABLE 5

|  |  | Example 18 | Comparative Example 2 |
|---|---|---|---|
|  | Name of paint | Paint 5 | CP-1 |
| Photocatalytic activity | Limit contact angle (°) *3 | 5 | 87 |
|  | Limit contact angle (°) *4 | 8 | 70 |
|  | Decomposition coefficient R *3 | 13 | 0 |
|  | Decomposition coefficient R *4 | 11 | 0 |

*3 Value observed before sunshine weatherometer testing
*4 Value observed after sunshine weatherometer testing

INDUSTRIAL APPLICABILITY

A inorganic fine particle dispersant according to the present invention is capable of stably dispersing inorganic fine particles such as silica fine particles or titanium oxide in a reactive compound at a high concentration. The resulting inorganic fine particle dispersion liquid has good storage stability and the inorganic fine particle dispersion has good fluidity. A paint using the dispersion is particularly useful as a paint for building exterior required to achieve long-term weatherability and a paint for a thermally deformable substrate such as plastic. A cured product obtained by curing the paint has good long-term outdoor weatherability and good wear resistance.

The invention claimed is:

1. An inorganic fine particle dispersion liquid comprising: inorganic fine particles; and
an inorganic fine particle dispersant, comprising, as an essential component, a compound resin (A) obtained by forming a bond between a polysiloxane segment (a1) and a vinyl-based polymer segment (a2),
wherein the polysiloxane segment (a1) has a structural unit represented by general formula (1) and/or general formula (2), the polysiloxane segment (a1) further has a first silanol group and/or a first hydrolyzable silyl group before forming the bond, wherein the vinyl-based polymer segment (a2) has a second silanol group and/or second hydrolyzable silyl group before forming the bond, wherein the bond is represented by general formula (3), the bond being formed as a result of a dehydration condensation reaction between the first silanol group and/or first hydrolyzable silyl group and the second silanol group and/or the second hydrolyzable silyl group:

$$\begin{array}{c} R^1 \\ | \\ -O-Si-O- \\ | \\ O \\ | \end{array} \quad (1)$$

$$\begin{array}{c} R^2 \\ | \\ -O-Si-O- \\ | \\ R^3 \end{array} \quad (2)$$

(in general formulae (1) and (2), $R^1$, $R^2$, and $R^3$ each independently represent a group having one polymerizable double bond selected from the group consisting of —$R^4$—CH=$CH_2$, —$R^4$—C($CH_3$)=$CH_2$, —$R^4$—O—CO—C($CH_3$)=$CH_2$, and —$R^4$—O—CO—CH=$CH_2$ (where $R^4$ represents a single bond or an alkylene group having 1 to 6 carbon atoms), an alkyl group having 1 to 6 carbon atoms, a cycloalkyl group having 3 to 8 carbon atoms, an aryl group, or an aralkyl group having 7 to 12 carbon atoms;)

[Chem. 3]

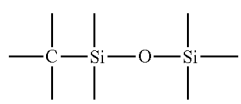

(3)

(in general formula (3), the carbon atom is part of the vinyl-based polymer segment (a2) and the silicon atom bonded only to the oxygen atom is part of the polysiloxane segment (a1)).

2. An inorganic fine particle dispersion wherein inorganic fine particles and an inorganic fine particle dispersant are dispersed in a reactive compound;

the inorganic fine particle dispersant comprising, as an essential component, a compound resin (A) obtained by forming a bond between a polysiloxane segment (a1) and a vinyl-based polymer segment (a2), wherein the polysiloxane segment (a1) has a structural unit represented by general formula (1) and/or general formula (2), the polysiloxane segment (a1) further has a first silanol group and/or a first hydrolyzable silyl group before forming the bond, wherein the vinyl-based polymer segment (a2) has a second silanol group and/or second hydrolyzable silyl group before forming the bond, wherein the bond is represented by general formula (3), the bond being formed as a result of a dehydration condensation reaction between the first silanol group and/or the first hydrolyzable silyl group and the second silanol group and/or the second hydrolyzable silyl group:

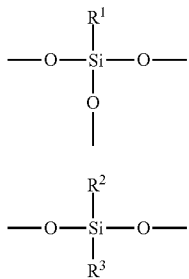

(in general formulae (1) and (2), $R^1$, $R^2$, and $R^3$ each independently represent a group having one polymerizable double bond selected from the group consisting of $-R^4-CH=CH_2$, $-R^4-C(CH_3)=CH_2$, $-R^4-O-CO-C(CH_3)=CH_2$, and $-R^4-O-CO-CH=CH_2$ (where $R^4$ represents a single bond or an alkylene group having 1 to 6 carbon atoms), an alkyl group having 1 to 6 carbon atoms, a cycloalkyl group having 3 to 8 carbon atoms, an aryl group, or an aralkyl group having 7 to 12 carbon atoms)

[Chem. 3]

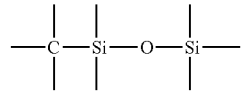

(3)

(in general formula (3), the carbon atom is part of the vinyl-based polymer segment (a2) and the silicon atom bonded only to the oxygen atom is part of the polysiloxane segment (a1)).

3. A paint comprising the inorganic fine particle dispersion according to claim 2.

* * * * *